Jan. 31, 1956     F. BURNETT     2,733,076
WHEELED LUGGAGE
Filed Jan. 15, 1953
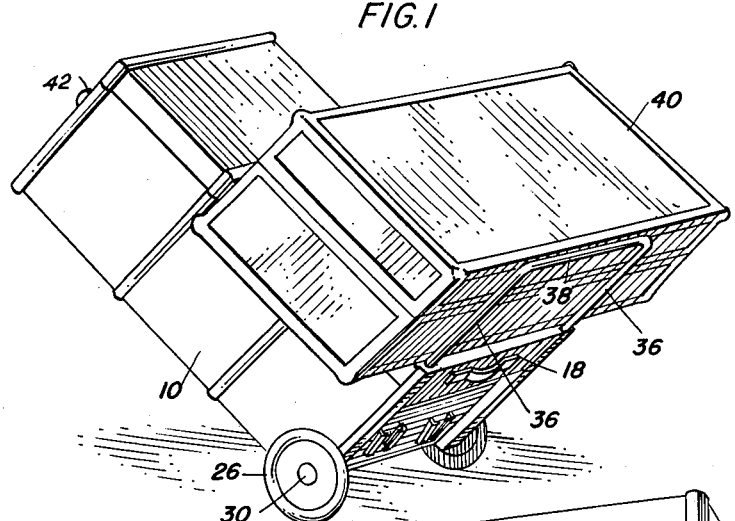
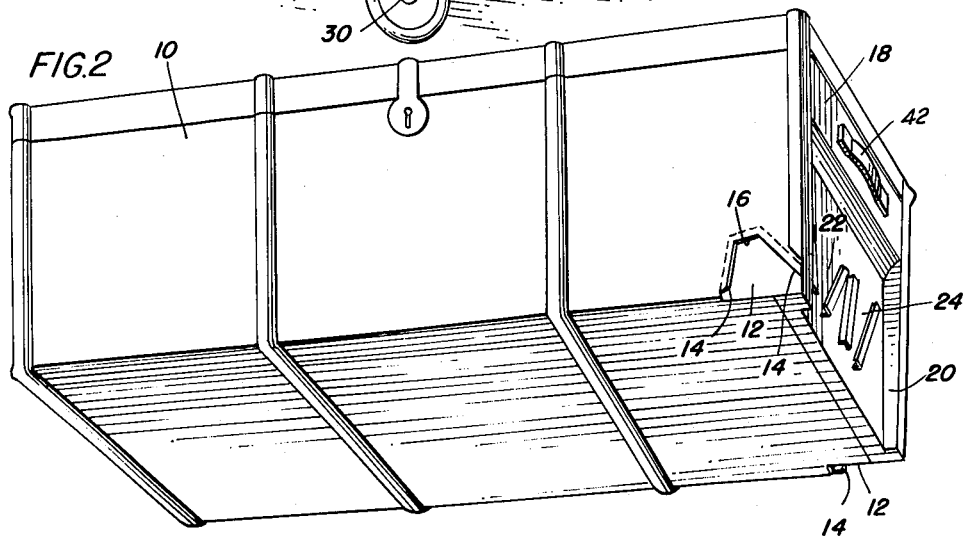
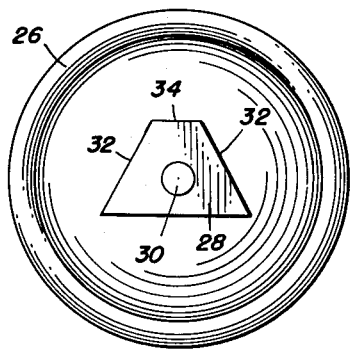
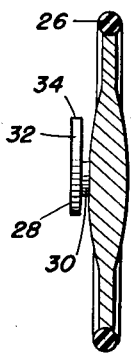
INVENTOR:
FRED BURNETT
BY
ATT'YS

United States Patent Office 2,733,076
Patented Jan. 31, 1956

2,733,076
WHEELED LUGGAGE

Fred Burnett, Waukegan, Ill.

Application January 15, 1953, Serial No. 331,519

2 Claims. (Cl. 280—36)

(Granted under Title 35, U. S. Code (1952), sec. 266)

This invention relates in general to improvements in wheel means for attachment to hand luggage such as suitcases, trunks, foot lockers and is more particularly described as a receptacle for hand luggage which is provided with removable wheels attached to be applied at one edge or corner of the luggage or receptacle or optionally stored when not in use at the end of the receptacle where the wheels are free from engagement with other luggage.

More particularly, it is desired to provide a pair of wheels with means for mounting the wheels in connection with the lower edge of a foot locker, trunk, or other articles of baggage in such a way that the luggage may be supported on the wheels and tilted upwardly therefrom so that the luggage may be partially balanced and moved freely about using the up-inclined end or any portion thereof as the means for wheeling the luggage from place to place.

When not in use, the wheels may be disengaged from their connection without lowering of the luggage and attached in place at the side or end of the luggage, preferably in a recess where they will not interfere with the stacking or storage of the luggage with other luggage.

An important object of the invention is to provide a wheeled receptacle of this class in which the wheels with their mountings are each separately applied to the receptacle at a lower edge or optionally removed therefrom and attached in a recess at the end of the receptacle where they are free from engagement with other luggage.

A further object of the invention is to provide an extensible bar at the wheel-supporting end of the luggage which will engage and support additional luggage using the original wheel luggage as a conveying truck.

A further object of the invention is to provide supporting wheels mounted upon irregular supports which are engageable with sockets to support the wheels at the corners at one end of the receptacle.

Other objects of the invention will appear in the specification and will be more apparent from the accompanying drawings, in which:

Fig. 1 is a perspective view of a piece of luggage such as a small trunk or foot locker equipped with wheels in accordance with the invention for wheeling it in a tilted condition and also supporting a piece of extra luggage by means of an extensible end bar;

Fig. 2 is a perspective view of an end of a piece of hand luggage showing the recesses at one end and at one of the corners thereof for supporting the detachable wheels therein; and Figs. 3 and 4 are side and edge elevations of the wheel and its mounting structure in accordance with this invention.

This invention is applied to hand luggage and other receptacles for the purpose of easily moving them from one place to another without the necessity of other wheel vehicle attendants which make it possible for a traveler to transport his own luggage by simply attaching wheels at the lower edges of the receptacle and tilting it upwardly at the other end which is used as a handle for pushing or pulleying the luggage upon the mounting wheels.

Referring now more particularly to the drawings, a small trunk or foot locker 10 or any other similar receptacle or article of baggage is provided at opposite corners of one preferably lower end thereof with sockets 12 having undercut portions 14 at opposite sides which are preferably at a converging angle toward each other and are connected at a distance from the opening of the socket by an angular portion 16.

The adjacent end 18 of the receptacle is provided with a recess portion 20 extending from the bottom thereof and having therein two sockets 22 and 24 similar in size and shape to the socket 12.

A pair of wheels is provided for the sockets 12 at opposite corners of the receptacle, each wheel 26 having an irregular block mounting 28 secured to the axle 30 of the wheel, the block mounting being entirely at one side of the wheel and spaced therefrom and having opposite converging sides 32 connected by a cross piece 34. This mounting 28 is adapted to be inserted in the socket 12 at either sides of the receptacle and also to be inserted in the socket 22 or 24 at the end of the receptacle. When a wheel is located in the end sockets 22 and 24, the outer face is preferably flush with the outer surface of the end 18 of the receptacle so that it is within the confines of the outer surface and may be stored compactly with other luggage. The block is preferably irregular in shape so that it will fit tightly within the sockets 12, opening from the underside of the luggage receptacle 10, but when removed therefrom for storage in the end sockets 22 and 24, the block 28 is inserted in the undercut recesses opening from the receptacle when it is in an upright position. If desired, a small latch or lock (not shown) may be provided for holding the wheels in this storage in position. In the recessed end 18 a luggage carrier may be mounted comprising a frame having side bars 36 slidable upwardly and a connected cross bar 38 so that an extra suitcase or other luggage 40 may be carried on top of the wheeled luggage receptacle 10 and engaging the carrier bar frame which is extended upwardly from the receptacle as shown in Fig. 1.

With this construction the wheels 26 are normally carried in the sockets 22 and 24 at the end of the receptacle when the luggage is stored or packed with other luggage, but whenever it is desired to move the luggage the wheels are disconnected from the sockets 22 and 24 and are applied to the sockets 12 at the lower corners of the receptacle. The other end of the receptacle is then tilted upwardly and may be moved upon the wheels in either direction by engaging a hand grip 42, one of which is commonly provided at each end of the luggage so that it may be pushed or pulled in any direction at a substantially balanced inclination. If extra luggage is provided, the carrier frame is pulled out of the lower end and this luggage is deposited on top of the receptacle 10 in the angle between it and the carrier frame.

In preparing the luggage for storage, the wheels are dismounted from the sockets 12 and placed in the end sockets 22 and 24 with the outer surface of the wheels flush or below the end 18 of the luggage. The carrier frame 36—38 is also positioned within the end 18 by pushing the side bars 36 downwardly therein.

While I have thus described a preferred description in some detail, it should be regarded as an example or embodiment of the invention and not as a restriction or limitation therein as many changes may be made in the construction and arrangement of the parts without departing from the spirit and scope of the invention.

The invention described herein may be manufactured and used by or for the Government of the United States of America for government purposes without payment of any royalties thereon and therefor.

I claim:

1. The combination with a luggage receptacle having sockets near the opposite sides of one end each with opposite undercut side portions at a converging angle to each other and inwardly from the opening of the socket and upwardly from the bottom of the receptacle and other similar sockets at said end of the receptacle opening downwardly from the top of the receptacle and removable wheels with axles for the receptacle each having a mounting block connected to the wheel axle and spaced laterally at one side of the wheel, the block having opposite converging sides adapted to be received in the undercut portions of the sockets at said end of the receptacle and at the side portions thereof.

2. Wheeled luggage in accordance with claim 1 in which there is a recess in the end of said receptacle with said sockets in the recess for receiving the blocks of removable wheels so that the outer surfaces of the wheels are below or flush with the outer surface of this end of the receptacle when the wheels are mounted in the sockets therein.

References Cited in the file of this patent

UNITED STATES PATENTS

| | | |
|---|---|---|
| 832,628 | Schreffler | Oct. 9, 1906 |
| 2,361,592 | Bjork | Oct. 31, 1944 |
| 2,428,954 | Apblett et al. | Oct. 14, 1947 |
| 2,439,660 | Keil | Apr. 13, 1948 |
| 2,539,993 | Davis | Jan. 30, 1951 |
| 2,562,686 | Altemus | July 31, 1951 |
| 2,590,178 | Jamison | Mar. 25, 1952 |
| 2,603,505 | Arrowood | July 15, 1952 |
| 2,604,333 | Elmer | July 22, 1952 |
| 2,661,220 | Davis | Dec. 1, 1953 |

FOREIGN PATENTS

| | | |
|---|---|---|
| 726,446 | Germany | Oct. 14, 1942 |